Sept. 12, 1933.　　　　I. H. FREESE　　　　1,926,041
GLASS TRANSFER MECHANISM
Original Filed Nov. 29, 1927　　10 Sheets-Sheet 1
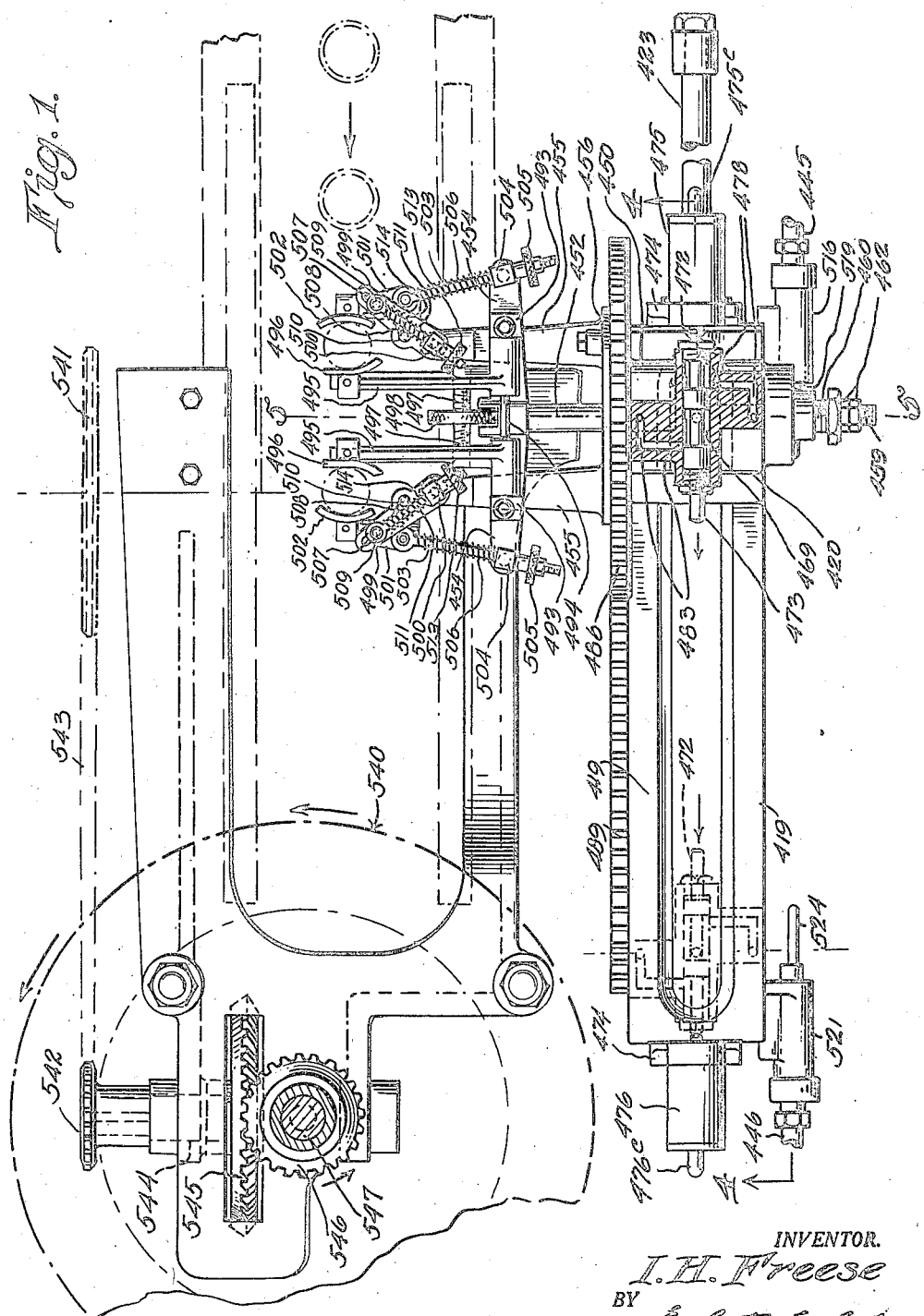
INVENTOR.
I. H. Freese
BY
ATTORNEYS.

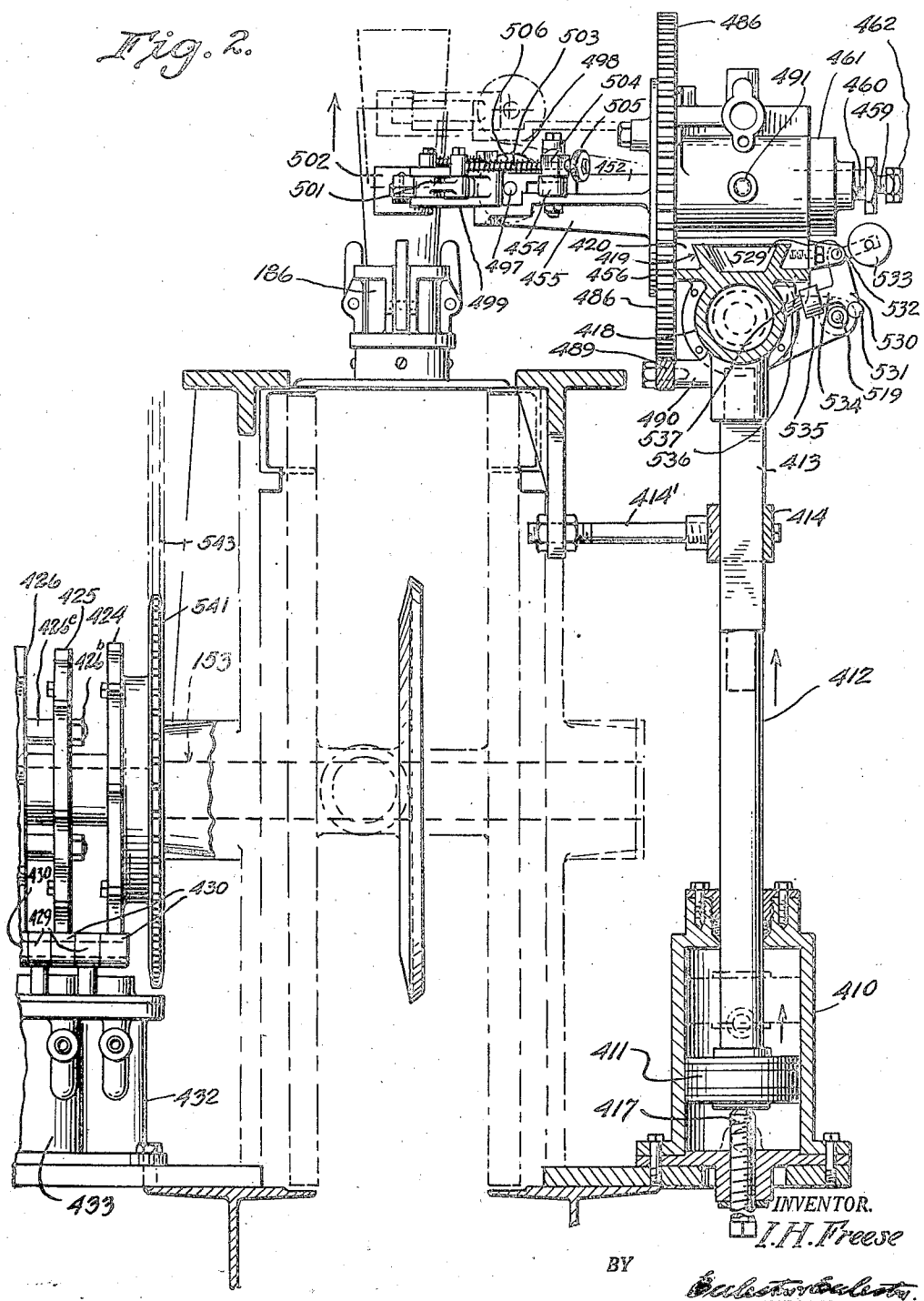

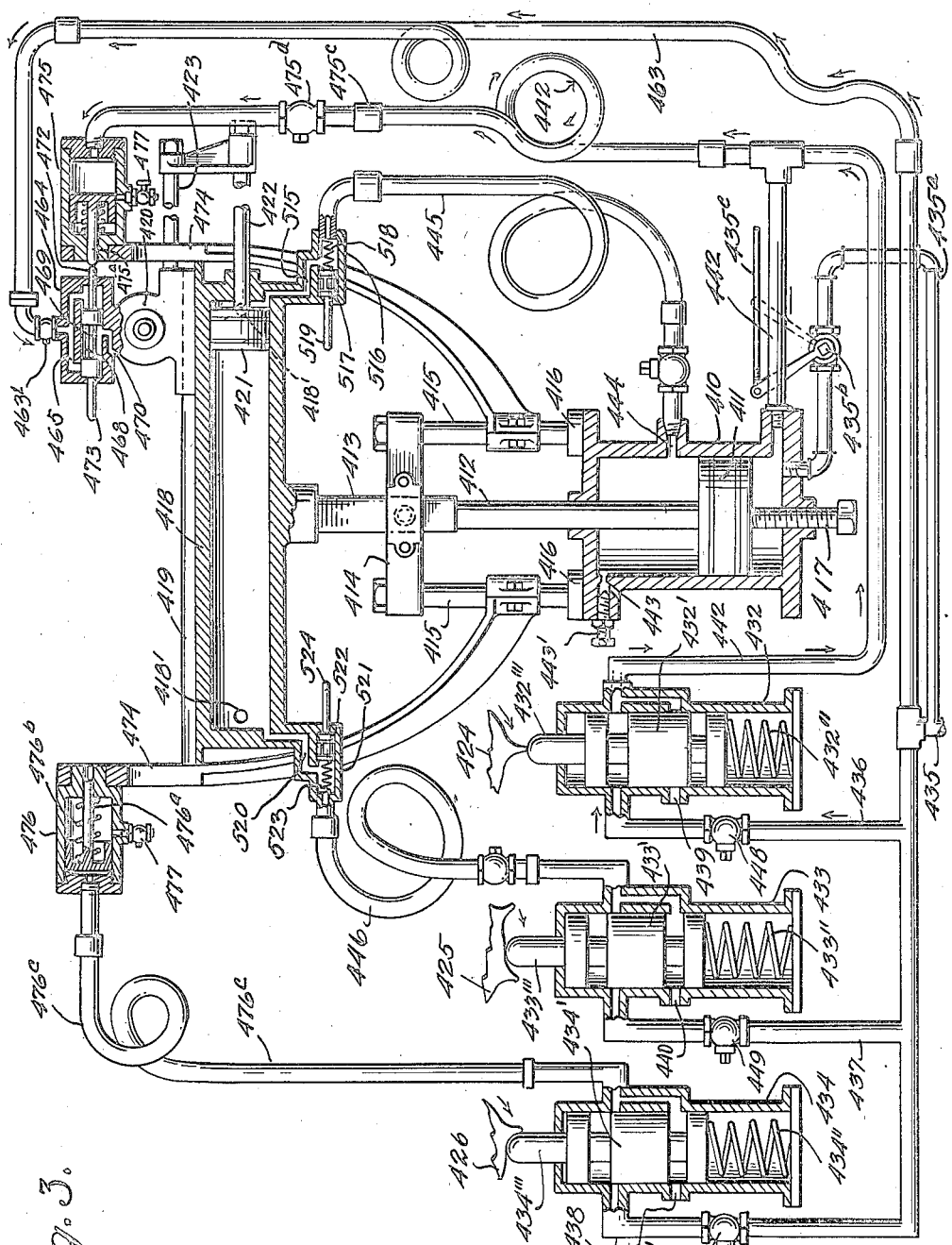

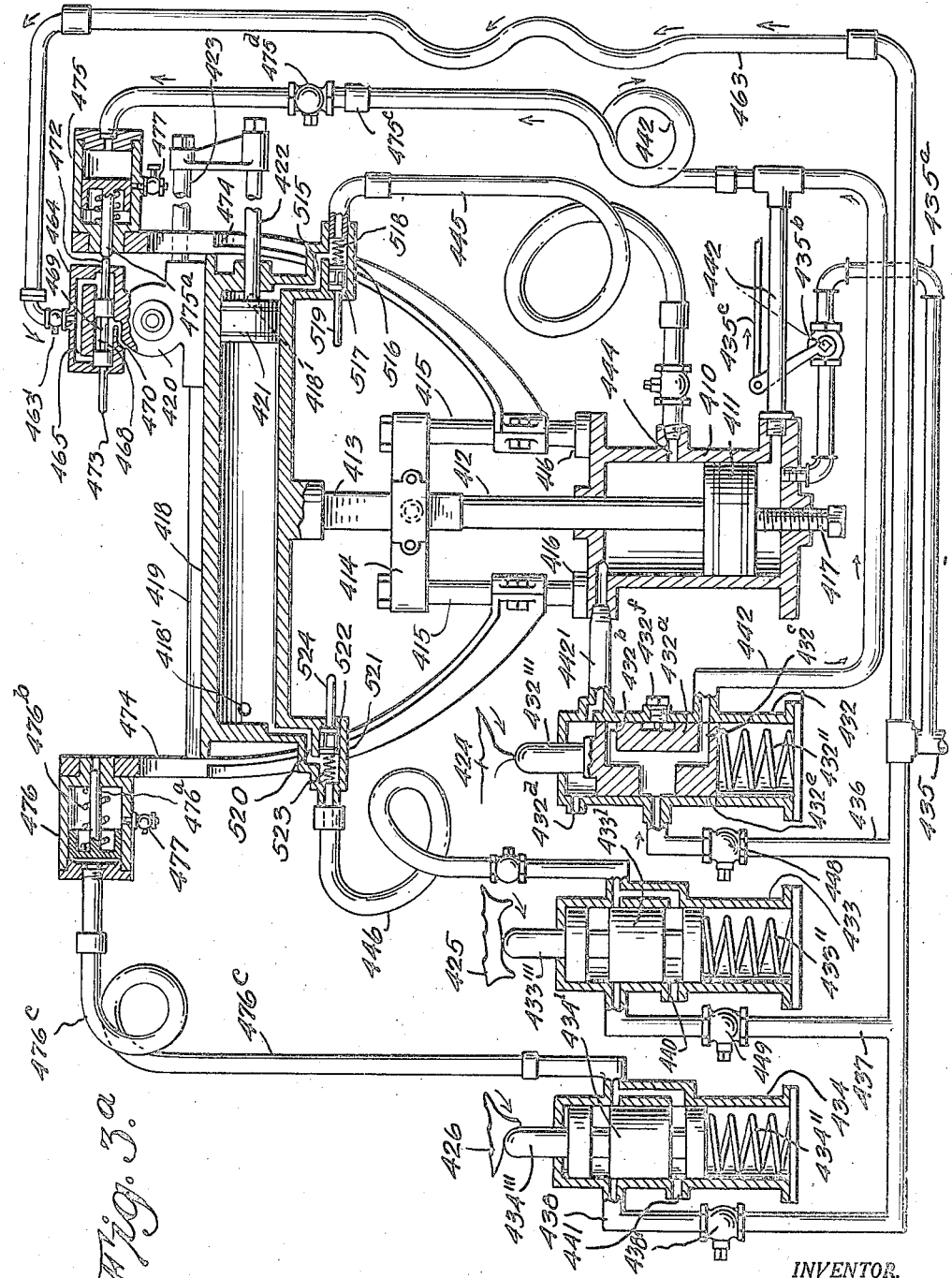

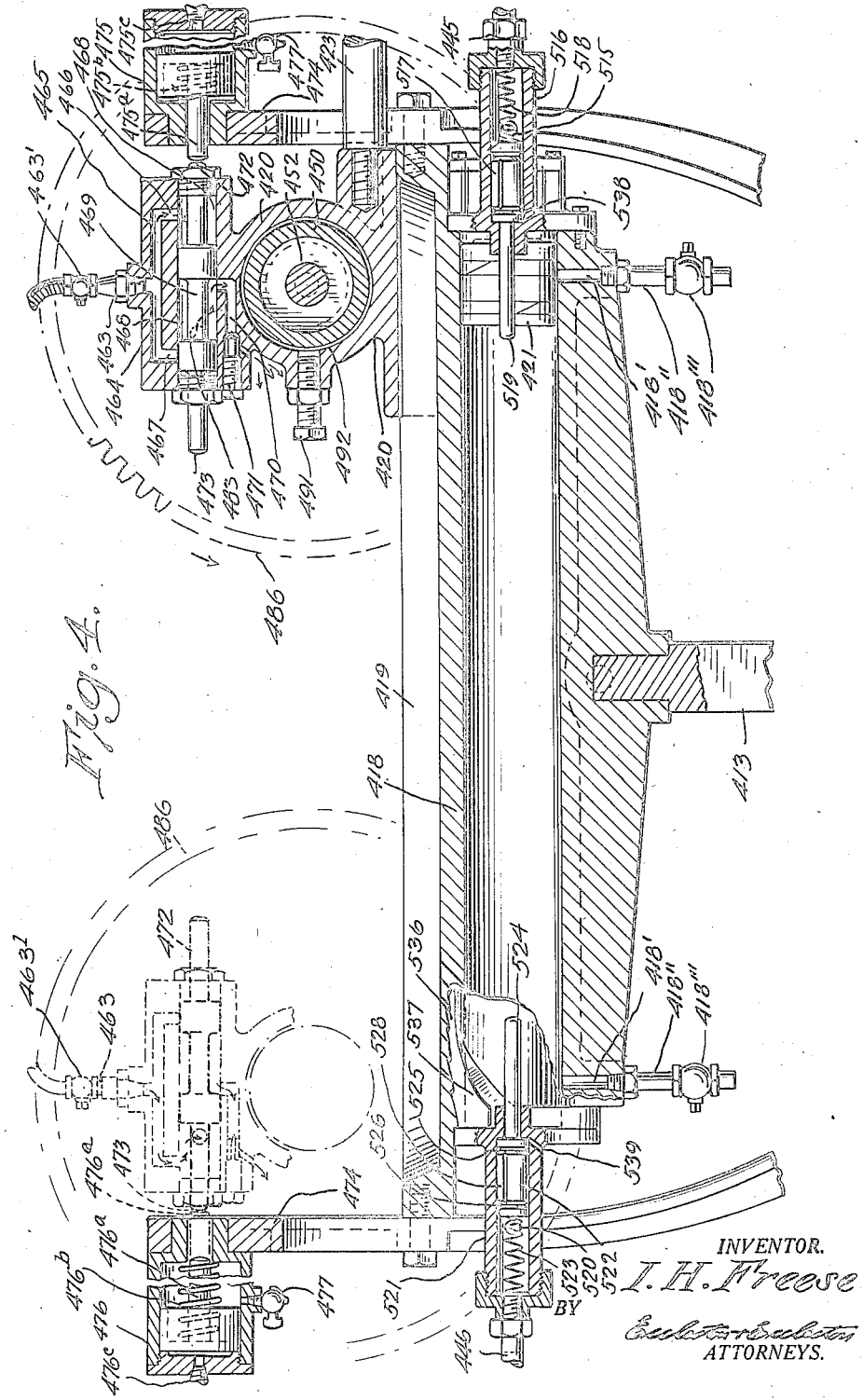

Sept. 12, 1933.  I. H. FREESE  1,926,041
GLASS TRANSFER MECHANISM
Original Filed Nov. 29, 1927  10 Sheets-Sheet 6
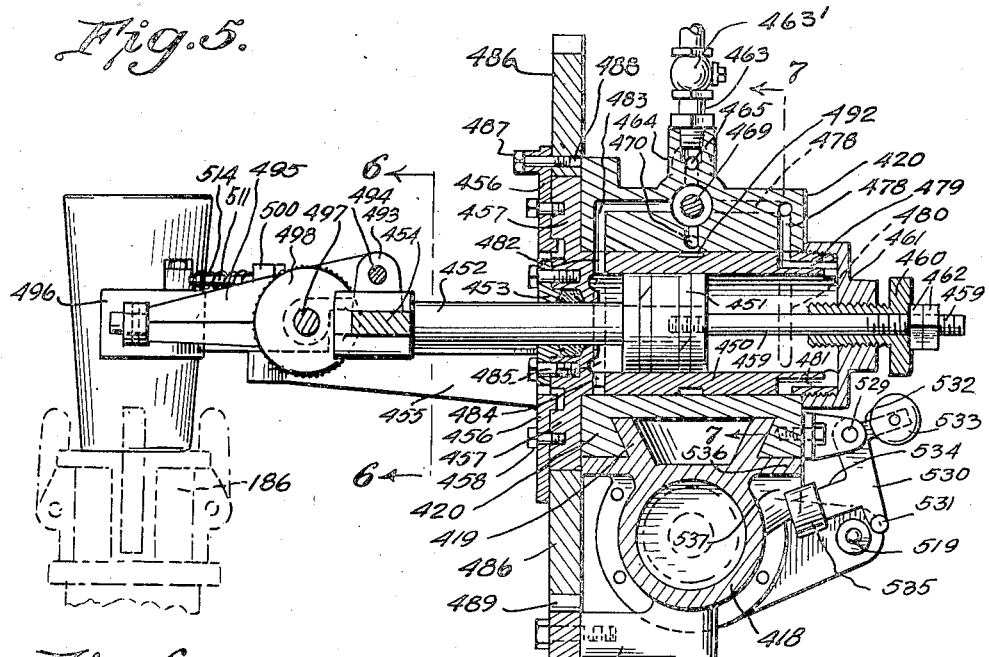
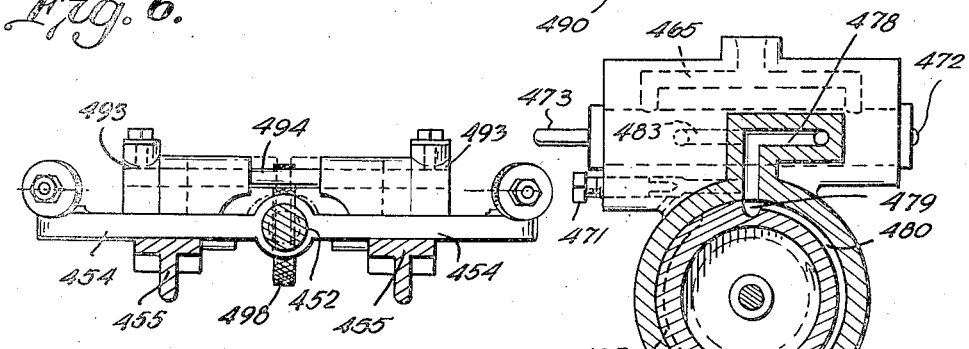
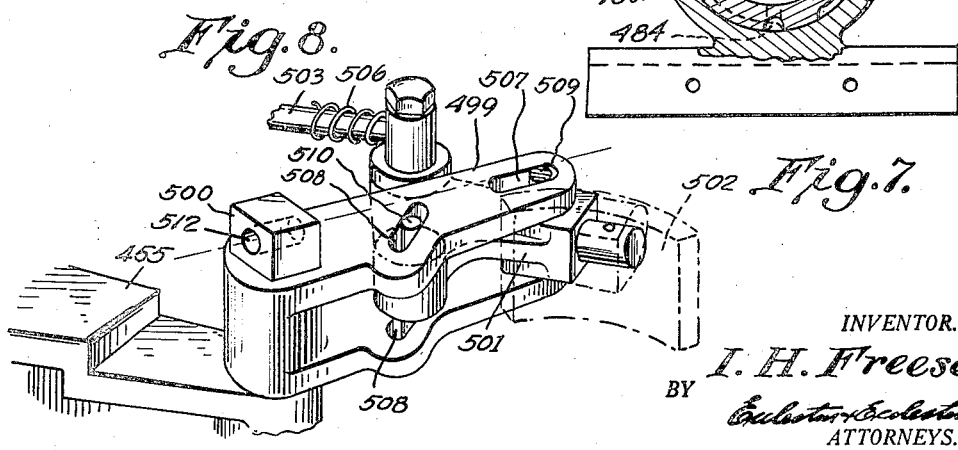
INVENTOR.
I. H. Freese
BY
Eccleston & Eccleston
ATTORNEYS.

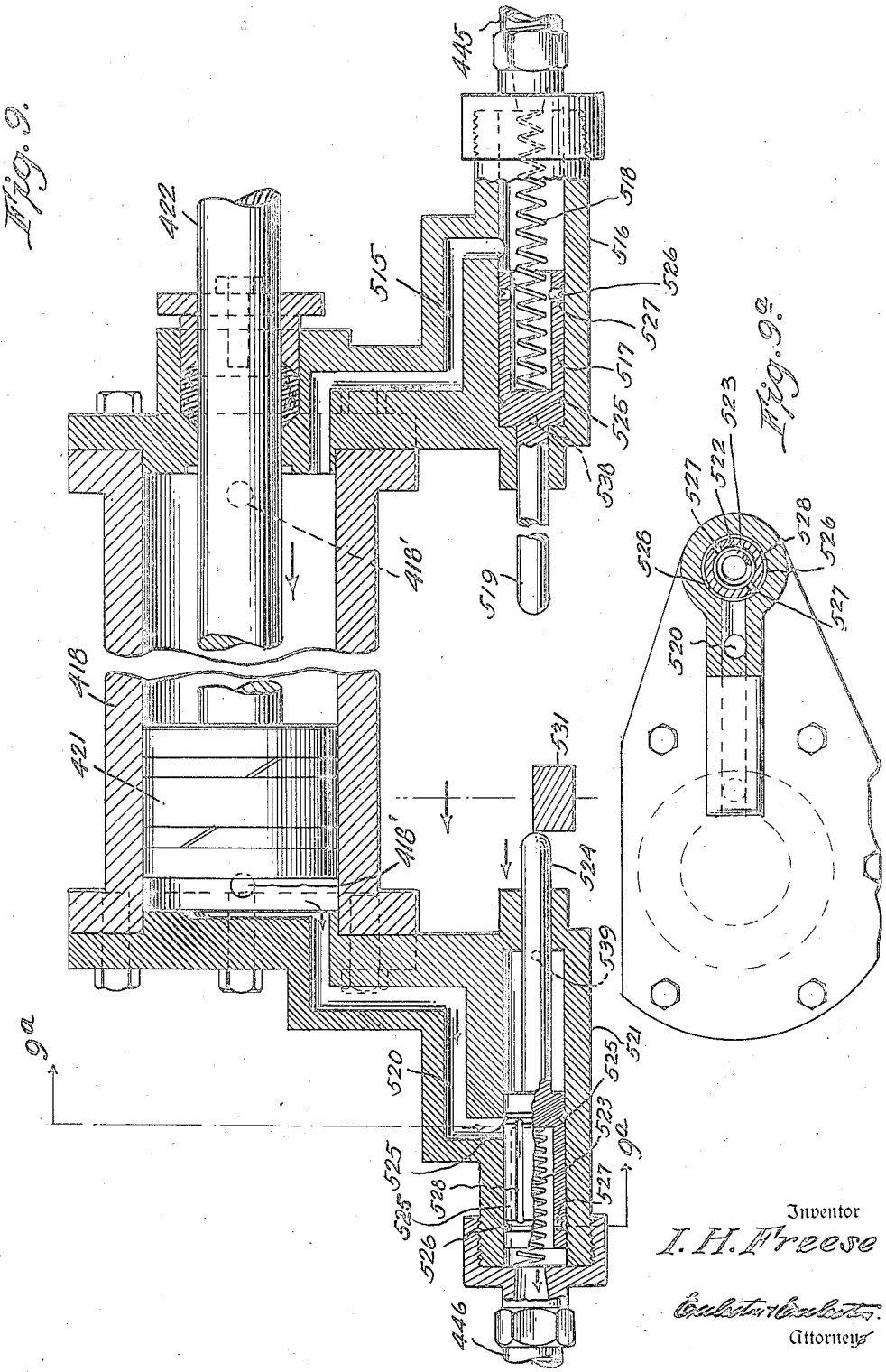

Sept. 12, 1933.  I. H. FREESE  1,926,041
GLASS TRANSFER MECHANISM
Original Filed Nov. 29, 1927    10 Sheets-Sheet 8
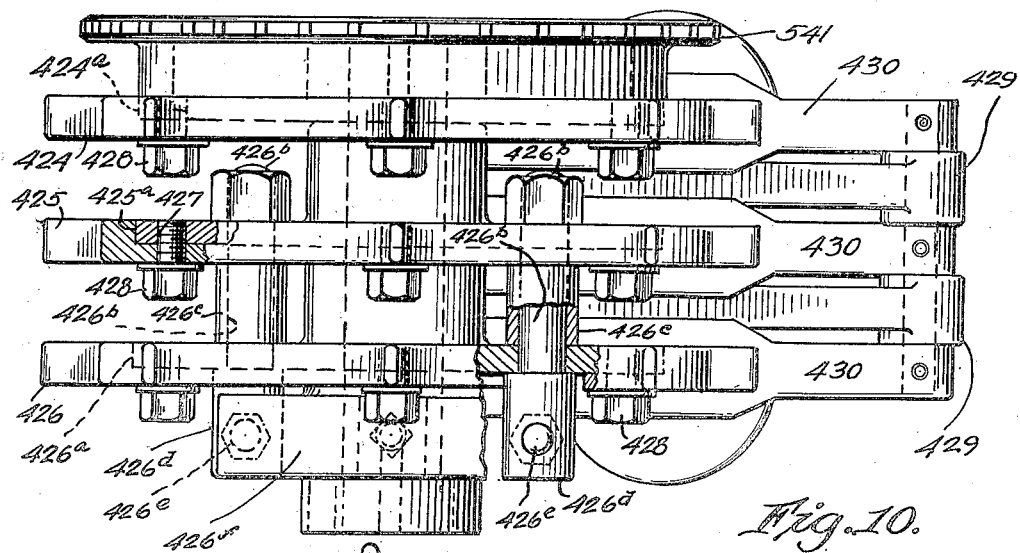
Fig. 10.
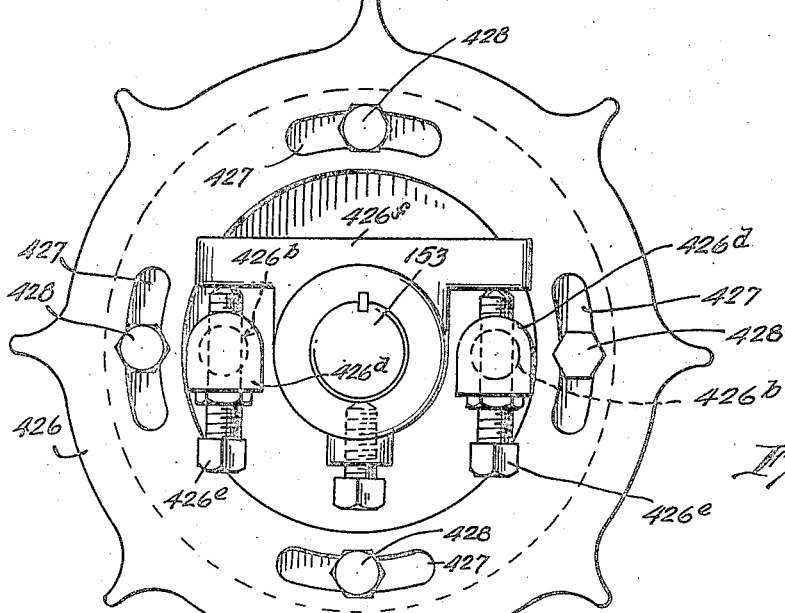
Fig. 10.ᵃ
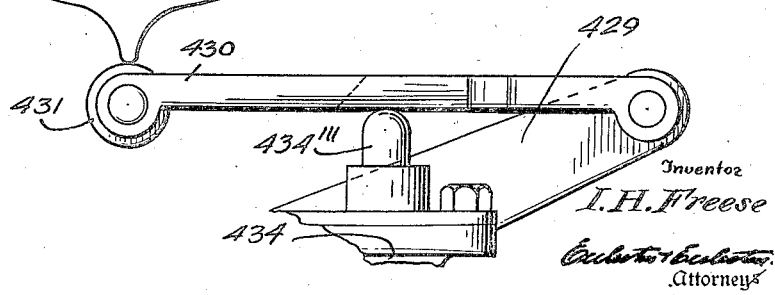
Inventor
I. H. Freese
Attorneys

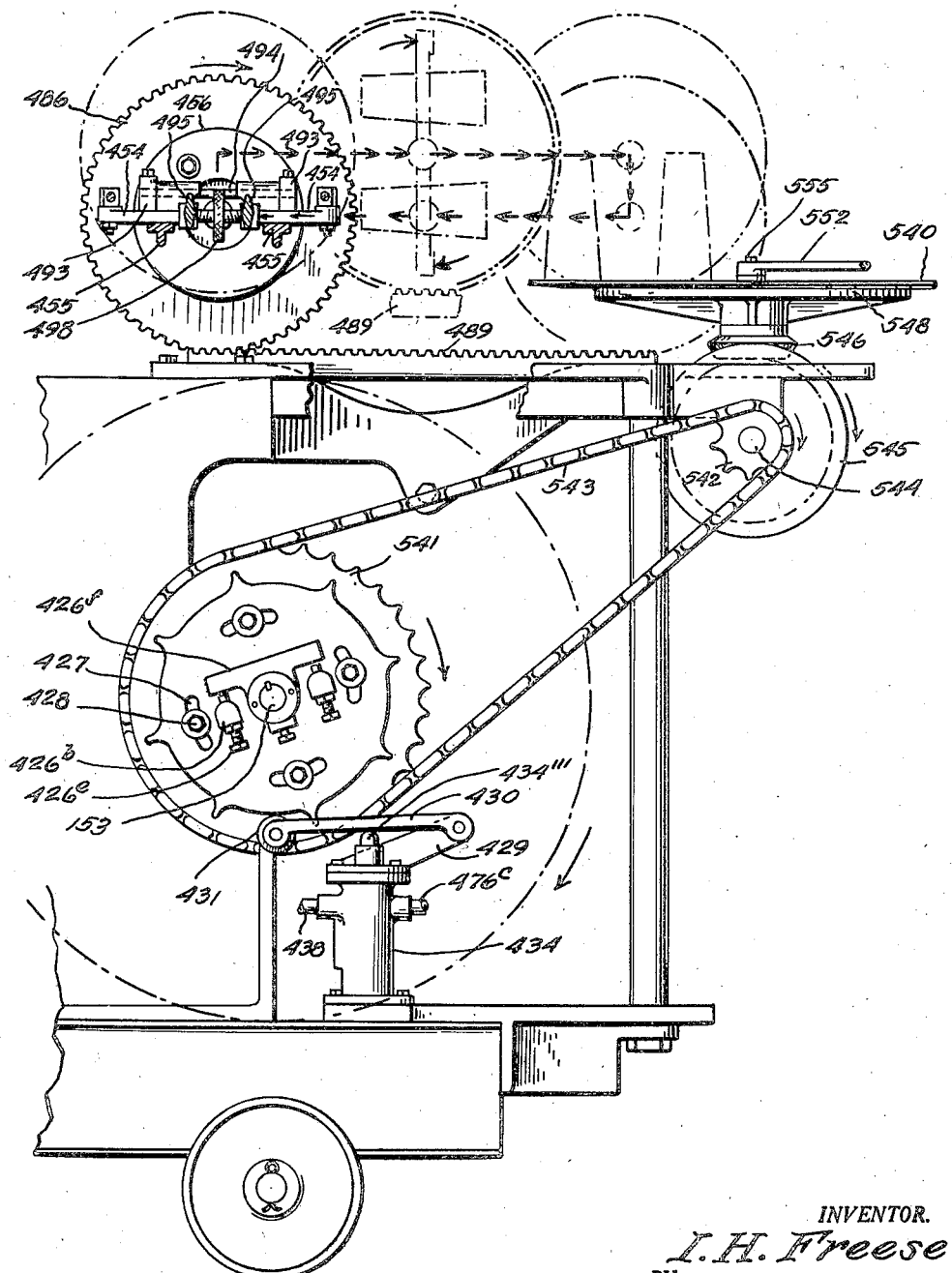

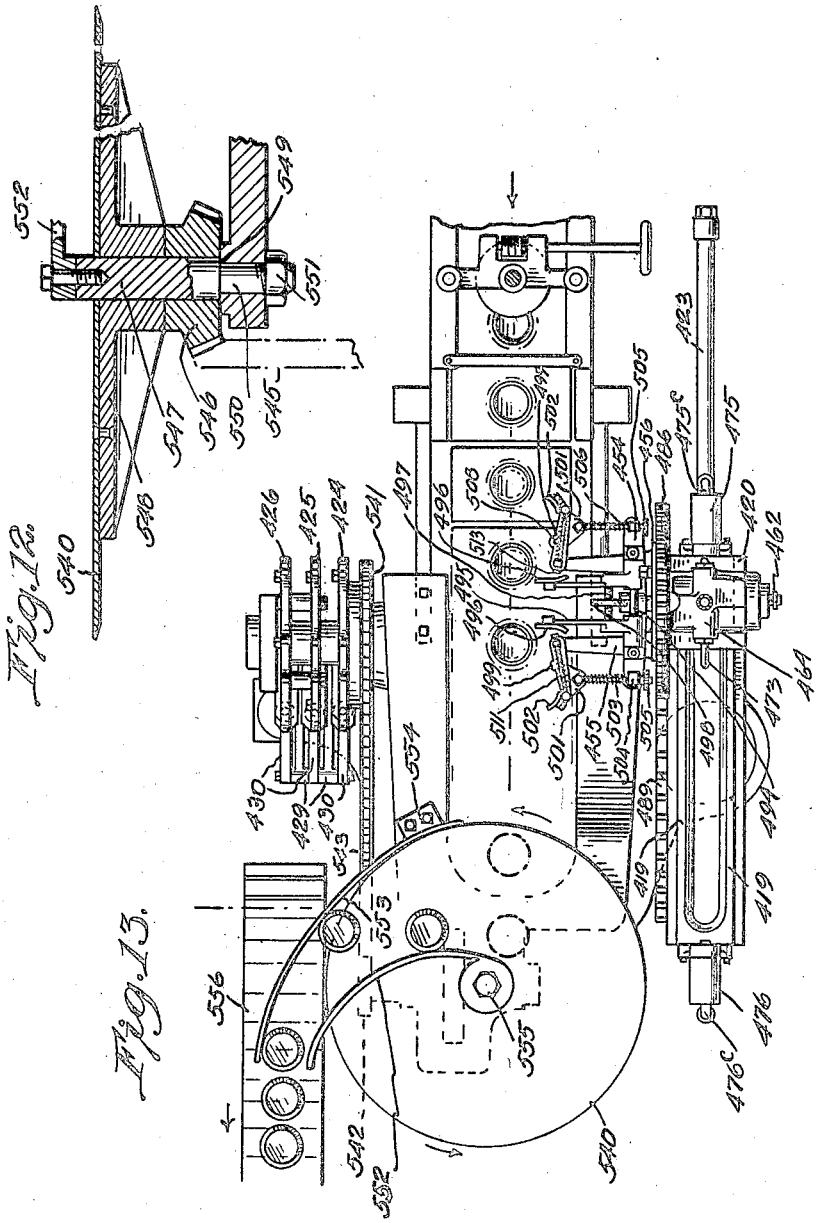

Patented Sept. 12, 1933

1,926,041

UNITED STATES PATENT OFFICE 1,926,041

GLASS TRANSFER MECHANISM

Ira H. Freese, Clarksburg, W. Va., assignor to Hazel-Atlas Glass Co., Wheeling, W. Va., a corporation of West Virginia Original application November 29, 1927, Serial No. 236,524. Divided and this application April 28, 1930. Serial No. 448,074

29 Claims. (Cl. 214—1)

The invention relates to a transfer mechanism for removing glassware from a conveyer, such as the conveyer of a fire-finisher. The numerous novel features will appear from the detailed description, and will be defined by the appended claims.

This application is a division of my application Serial No. 236,524, filed November 29, 1927.

Referring to the drawings:

Figure 1 is a plan view of the transfer device; parts being shown in section.

Figure 2 is a side view of the transfer device; parts being shown in section.

Figure 3 is a more or less diagrammatic view illustrating the operation of the various valves and cylinders.

Figure 3a is a view similar to Figure 3, but showing a slightly modified form of control for the cylinder which raises and lowers the transfer mechanism.

Figure 4 is a vertical sectional view taken on line 4—4 of Figure 1; and illustrating in dotted lines the position of the transfer mechanism at the delivery end of its stroke.

Figure 5 is a vertical sectional view taken on line 5—5 of Figure 1.

Figure 6 is a vertical sectional view taken on line 6—6 of Figure 5.

Figure 7 is a vertical sectional view taken on line 7—7 of Figure 5.

Figure 8 is a detail perspective view of one of the oscillatable gripper arms.

Figure 9 is an enlarged longitudinal sectional view of the cylinder which moves the transfer mechanism bodily back and forth between pick-up and deliver position, and the valves associated with the cylinder; the cylinder being broken away.

Figure 9a is a vertical sectional view taken on line 9a—9a of Figure 9.

Figure 10 is a detail plan view of the cams which control the operation of the transfer mechanism, and illustrating the preferred method of mounting the cams.

Figure 10a is a detail front elevational view of such cams, and illustrating the preferred method of adjusting the cams.

Figure 11 is a side elevational view of the delivery end of the machine, illustrating the means for operating the valves for the transfer mechanism, the continuously rotating disc for receiving the transferred ware, and illustrating diagrammatically several positions the transfer mechanism assumes in transferring the ware, inverting it, and depositing it on the rotating disc.

Figure 12 is a vertical sectional view of the rotating disc and the means by which it is supported and driven; and Figure 13 is a plan view of the transfer mechanism, the disc, and the conveyer with which the disc cooperates, and which leads to a leer (not shown), or to any desired point.

In this transfer mechanism, which is now to be described, two tumblers, or other articles, are simultaneously gripped, inverted, and transferred. By thus transferring two articles at a time, the number of operations per minute required to transfer a given number of articles, is reduced by half; or conversely, by operating this transfer mechanism at the speed required of transfer devices previously known, it will transfer twice the number of articles in a given time. While the mechanism is particularly adapted for simultaneously handling two articles, it will be apparent that it may just as readily be employed for transferring a single article at a time; and with slight changes it may be employed for simultaneously transferring three, four, or more, articles. Also the mechanism is adapted to invert the ware during its transfer movement; but, as will appear hereinafter, by a very simple adjustment, the step of inverting the ware may be omitted.

Numeral 410 indicates a cylinder for bodily raising and lowering the transfer mechanism; the cylinder being preferably mounted on one of the I-beams of the main frame of the fire-finisher. The cylinder is provided with the usual piston 411 and upwardly extending piston rod 412. Secured to, or integral with the upper end of the piston rod, is a squared rod 413, which is guided for vertical sliding movement, in a guide 414 which is fixed to the upper ends of two columns 415, which are supported by and extend upwardly from, brackets 416 on the cylinder 410. The guide 414 is suitably braced by a tie rod 414' having its ends secured to the guide and to the frame of the machine. The cylinder 410 is preferably provided with a rod or screw 417 threaded through the lower cylinder head and projecting upwardly into the cylinder to thereby adjustably limit the downward movement of the transfer mechanism. Obviously, any other suitable means may be employed for vertically adjusting the lower position of the transfer mechanism.

Suitably mounted on the upper end of the squared rod 413, is a horizontal cylinder 418, which is adapted to move the transfer mechanism bodily back and forth between the pick-up and delivery points. Extending longitudinally of the cylinder 418, on the upper side thereof, is a dovetail track or guideway 419, and slidably mounted for reciprocating movement on this track or guideway is a casting 420 which carries a cylinder for moving the grippers toward and from the ware conveyer, valve mechanism, means for inverting the grippers, etc. As stated above, the function of cylinder 418 is to move the transfer mechanism bodily back and forth between the pick-up and delivery points. Of course, various means may be employed for operatively connecting the cylinder 418 and the casting 420 which carries the transfer mechanism, but the preferred means, which I now employ, comprises a piston 421 and piston rod 422 operated by the cylinder 418; the end of the piston rod being tied to a rod 423 which has its opposite end fixed to the casting 420.

Before proceeding further, I shall describe the particular mechanism disclosed herein for controlling the operation of the cylinders 410 and 418. It will be seen that three cams, indicated by numerals 424, 425 and 426, are carried by the main drive shaft 153 of the fire-finisher conveyer; the cams being adjustable by any desired means, such as slots 427 and bolts 428, and each cam being provided with eight lobes, in the present construction. There are sixteen teeth on the driving sprocket of the machine, and the cups 186 which carry the ware through the fire-finisher, are spaced in accordance with the spacing of the teeth on the driving sprocket, and inasmuch as the transfer mechanism picks up two articles at each operation it will be apparent that there need be only half the number of cam lobes as there are teeth, accordingly each cam is provided with eight lobes. The preferred means for adjusting these cams will be described hereinafter. Numeral 429 indicates a bracket upon which are pivotally mounted three arms 430; these arms project substantially horizontally beneath the cams, and a roller 431 mounted on the free end of each arm is always in contact with its cam surface; it being understood that there is one of these arms for each cam. Beneath the arms are three valve casings 432, 433 and 434, which are respectively associated with the cams 424, 425 and 426. Slidably mounted in the valve casings 432, 433 and 434, are valves 432', 433' and 434', respectively, normally forced upwardly by springs 432'', 433'' and 434'', and having valve stems 432''', 433''', and 434''', respectively which engage the arms 430, and thus press the rollers 431 upwardly against their respective cams. As each lobe of each cam engages its roller, its arm will be forced downwardly, thereby depressing its particular valve, against the pressure of the spring. In Figure 3, which is more or less diagrammatic, the cams are shown as directly engaging the valve stems.

Numeral 435 indicates the air line for operating the various cylinders, and leading from this line are branch lines 436, 437 and 438, communicating respectively with the upper end of the valve casings 432, 433 and 434. Exhaust ports 439, 440 and 441 are provided in the valve casings 432, 433 and 434, respectively; and the valves 432', 433' and 434' are so constructed that in their normal upper position they will shut off communication with the live air lines and open communication with the atmosphere through the exhaust ports 439, 440 and 441; and when the valves are depressed by the cams, communication will be opened with the live air lines and the exhaust ports will be shut off. A complete cycle of operation of the various valves will be described hereinafter, but the manner of operating the cylinders 410 and 418 may be described at this point; reference being had particularly to Figure 3. It will be noted by an inspection of Figure 3, that the cam 424 has depressed valve stem 432''', thereby admitting fluid pressure through pipe 442 to the lower end of the cylinder 410. The piston 411 will thus be moved upwardly, to bodily elevate the transfer mechanism. It will be understood, of course, that before the occurrence of this step in the cycle of operation, the grippers have already been projected into cooperative position with respect to the ware to be transferred, and have been closed to grip the ware. The upper end of cylinder 410 has an exhaust port 443, which is preferably provided with an adjustable needle valve 443' to regulate the exhaust and thus provide a cushioning effect for the upward stroke of the piston 411. Just as the piston 411 is about to complete its upward movement it uncovers a port 444, which permits the fluid pressure beneath the piston to flow through a flexible pipe 445 to the right hand end (Fig. 3) of cylinder 418. This admission of fluid pressure will cause the piston 421 to move to the left (Fig. 3) to thereby bodily move the transfer mechanism from the pick-up position to the point of delivery of the transferred ware. During this stroke of the piston 421, the left hand end of the cylinder 418 is exhausting through the flexible pipe 446, valve 433' and valve casing exhaust port 440, to atmosphere. Just as the piston reaches the end of this stroke, cam 424 will release the valve 432', so that it will be moved upwardly by the spring 432'', to open the lower end of cylinder 410 to the atmosphere through pipe 442, valve 432' and valve casing exhaust port 439. The piston 411 and the transfer mechanism carried thereby, thus move downwardly by gravity to their lowered position; this position being regulated by the threaded rod or screw 417. While the transfer mechanism is at the delivery position the grippers will be opened to release the ware, and will be withdrawn out of alignment with the ware carrying cups; as will be described hereinafter. After such operations have been performed, cam 425 will depress valve stem 433''', thereby admitting fluid pressure through the flexible pipe 446 to the left hand end (Fig. 3) of the cylinder 418, to move the piston 421 and the transfer mechanism back to the pick-up position. During this stroke the right hand end of the cylinder 418 will exhaust through pipe 445, cylinder 410, and exhaust port 443. The lines 436 and 437, leading to the valve casings 432 and 433 respectively, are preferably provided with valves 448 and 449 respectively, to control the volume of fluid to the cylinders. As a safety device, to raise the transfer mechanism in any emergency, and to maintain it in raised position as long as desired, I provide a pipe 435a leading from the main air line 435 to the lower end of the cylinder 410; and place in the pipe 435a a valve 435b which may be operated by a connecting rod 435c leading to the forward end of the machine and connected with a hand lever (not shown). This mechanism is shown more or less diagrammatically in Figures 3 and 3a, and in both of these figures the valve is shown in closed position.

By opening this valve, air pressure will be admitted directly to the lower end of the cylinder, thereby elevating the piston 411 and the transfer mechanism carried thereby.

Having described, in a general way, the means for bodily raising and lowering the transfer mechanism, and the means for moving the transfer mechanism bodily back and forth between the pick-up and delivery positions, I shall now proceed with the description of the mechanism carried by the casting 420 such as the means for moving the grippers into and out of position to grip the ware, the means for opening and closing the grippers, the means for inverting the ware during its transfer, the means for rendering inoperative the inverting means, etc.

The casting 420, which is moved back and forth on the dovetail track or guide way 419, is centrally bored to receive a cylinder or sleeve 450; this sleeve or cylinder being rotatable as will appear hereinafter. Numeral 451 indicates the piston mounted in this cylinder 450, and its piston rod 452 extends through the usual stuffing box gland 453 and has fixed to its end a transversely extending crosshead 454 which carries the grippers. This crosshead travels back and forth on guide brackets 455—455. These guide brackets are integral with or attached to, an annular plate 456 which is concentric with and slightly spaced from the stuffing box gland 453, and which is attached to a flange 457 of the cylinder 450, by means of bolts 458. Thus when the cylinder 450 is rotated, the bracket guides 455, the crosshead 454, and the mechanism carried thereby, will also be rotated. Attached to the opposite end of the piston 451, is a rod 459 which extends rearwardly through a sleeve 460 threaded into the rear cylinder head 461. The rod projects beyond the sleeve, and has nuts 462 mounted on its threaded end portion. Thus by the adjustment of the nuts 462, the forward limit of the piston stroke may be adjusted, thereby adjusting the forward position of the grippers.

Referring now particularly to Figures 3, 4 and 5, it will be seen that a pipe 463, having a valve 463', leads from the main air line 435 to the valve casing 464, which is integral with or attached to the casting 420. Formed in this valve casing 464, and communicating with the pipe 463, is a horizontal passage 465 extending toward opposite ends of the valve casing, and extending downwardly from the opposite ends of the horizontal passage are vertical passages 466 and 467, which communicate at their lower ends with a horizontally extending valve chamber 468. Mounted for reciprocation in this valve chamber is a shuttle valve 469, which is so constructed that as it is moved back and forth it will alternately admit compressed air or other fluid pressure to one end of the cylinder 450, and at the same time permit the opposite end of the cylinder to exhaust to the atmosphere through the passage 470. This exhaust passage is preferably provided with an adjustable needle valve 471, whereby a cushioning effect may be provided at the ends of the stroke of the piston 451, thus giving a smoother operation.

The ends of the shuttle valve 469 are indicated by numerals 472 and 473, and it will be noted that they are of such length as to project, through suitable stuffing boxes, beyond the ends of the shuttle valve casing 464. A frame 474 is slidably mounted on the columns 415, and the upwardly extending arms of this frame are secured to the ends of the track 419; and mounted in the upper ends of these arms are cylinders 475 and 476 which shift the position of the shuttle valve. The frame 474 reinforces the structure as well as provides a support for the cylinders 475 and 476. Cylinder 475 is provided with a piston rod 475a in alignment with shuttle valve stem 472; and a spring 475b for normally maintaining the piston rod in retracted position. For projecting the piston rod forward into engagement with the shuttle valve stem 472, I provide a pipe 475c which leads from pipe 442 to the end of cylinder 475; the pipe 475c being preferably provided with a valve 475d to reduce the air pressure in cylinder 475. Likewise the cylinder 476 is provided with a piston rod 476a in alignment with shuttle valve stem 473; and a spring 476b for normally maintaining the piston rod in retracted position. For projecting the piston rod forward into engagement with the shuttle valve stem 473, I provide a pipe 476c which leads from valve casing 434 to the end of cylinder 476. The cylinders 475 and 476 are also preferably provided with drain cocks 477.

When cam 424 trips valve 432', air pressure will pass through pipe 442 to the lower end of cylinder 410, to elevate the transfer mechanism; and air pressure simultaneously passes through pipe 475c to the end of cylinder 475. The piston rod 475a will thus be projected forward into engagement with the shuttle valve stem 472, thereby shifting the shuttle valve to position to admit the air pressure from pipe 463 to the rear end of cylinder 450 to project the grippers forward to grip the ware. Of course, the ware must be gripped before the piston 411 of cylinder 410 elevates the transfer mechanism; and this mode of operation is accomplished by reason of the fact that cylinder 475 is much smaller in diameter than cylinder 410 and has to exert practically no force while cylinder 410 must lift the entire weight of the transfer mechanism. So that piston 475a will shift the shuttle valve to admit air pressure to the rear end of cylinder 450 to effect the closing of the grippers, an instant before the transfer mechanism is elevated by cylinder 410. The piston 475a is returned to its normal position by spring 475b as soon as valve 432' is returned to exhaust position. After the transfer mechanism has moved to its delivery position, and has been lowered by releasing the air in cylinder 410, the piston 476a will be shot forward by the operation of valve 434' to admit air pressure from pipe 438 to pipe 476c and thence to the end of cylinder 476; the volume of air being controlled by valve 438' in pipe 438. The shuttle valve will thus be shifted to permit the air pressure from pipe 463 to enter the forward end of cylinder 450, thereby causing the grippers to be opened and retracted, to release the ware. Immediately thereafter, cam 425 will operate valve 433' to admit fluid pressure to the left hand end (Fig. 3) of the cylinder 418, to move the transfer mechanism from delivery position to pick-up position.

The casting 420 is provided with a passage 478 which leads from the interior of the shuttle valve casing to a point adjacent the rear end of the cylinder or sleeve 450. The rear portion of this cylinder or sleeve has a fluid inlet passage 479 which aligns with the passage 478, when the cylinder is in the position illustrated in Figure 5, to admit fluid pressure to the rear end of the cylinder to move the grippers forward into position to grip the ware. As will appear hereinafter, the cylinder is rotated through 180° to invert the ware while it is being transferred, and in order that the piston may be maintained in its forward position during the rotation of the cylinder, I have provided the wall of the cylinder with a groove 480 which communicates at one end with the passage 479, and which extends almost 180° about the cylinder. Thus there will be full pressure behind the piston 451 during almost the complete period of inverting the ware. Diametrically opposed to the inlet passage 479 is an exhaust passage 481, so that when the cylinder has been rotated through 180° to invert the ware, the pressure behind the piston will be relieved through passages 481, 478 and 470; it being understood that at the instant the cylinder has rotated 180° to invert the ware, the shuttle valve is shifted, by the operation of cylinder 476, to exhaust the rear end of cylinder 450 and to admit fluid pressure to the front end of the cylinder to open the grippers and move them to position out of the path of the oncoming ware.

The forward end of cylinder 450 is provided with an exhaust passage 482. During the quick forward movement of the piston 451 this passage communicates with a passage 483 in the casting 420, leading to the interior of the shuttle valve casing. In Figure 5, the piston 451 is making its forward stroke to grip the ware, and consequently this exhaust passage 482 is shown in communication with the passage 483. The forward end of the cylinder 450 is also provided with an inlet passage 484 which comes into alignment with the passage 483 just as the cylinder 450 completes its rotation of 180° to invert the ware; and fluid pressure is admitted to the forward end of the cylinder, by the operation of valve 434', to open the grippers and move them out of the path of the oncoming ware, as soon as the transfer mechanism has settled by gravity to its lowered position. At this moment the transfer mechanism will start its travel in the opposite direction, and the cylinder 450 will start its rotation of 180° in the opposite direction. During this reverse rotation it is desirable to maintain full pressure in front of the piston 451, and for this purpose I have provided a groove 485 which communicates at one end with the passage 484, and which extends almost 180° around the outer wall of the cylinder 450.

The means for rotating the cylinder back and forth, and the means for rendering such means inoperative, will now be described; reference being had particularly to Figures 1, 2, 4, 5 and 11. Mounted on the annular flange 457 of the sleeve or cylinder 450 between the casting 420 and the annular plate 456, is a large gear wheel 486. This gear wheel is normally attached to the annular plate 456 by means of a bolt 487 which passes through this plate and is threaded in the opening 488 provided in this gear wheel; or, of course, any other appropriate means may be employed for normally attaching the gear wheel to the plate. As the gear wheel is normally attached to the plate 456, and as the plate is attached, by means of bolts 458, to the annular flange 457 of the cylinder 450, it is obvious that any rotation of the gear wheel will impart a similar rotation to the cylinder; and as the grippers are mounted on the brackets 455, which are carried by the plate 456, it is also obvious that any rotation of the gear wheel will impart a similar rotation to the brackets and the gripper mechanism mounted thereon. A rack 489 is suitably mounted on brackets 490 which are attached to or integral with the cylinder casing 418.

This rack 489 extends the full distance between the pick-up position and the delivery position, and is arranged beneath the gear wheel 486 and in engagement therewith; so that as the casting 420 travels back and forth between the pick-up position and the delivery position, the gear wheel will be rotated in opposite directions, thereby similarly rotating the grippers and the cylinder 450. Of course, the gear wheel 486 is so designed that it will make exactly a half rotation during the travel of the casting 420 in each direction. Thus when the casting travels from pick-up position to delivery position, the gear 486, and the parts associated therewith, will rotate through 180° to invert the ware; and when the casting 420 travels in the opposite direction, from delivery position to pick-up position, the gear 486 and the parts associated therewith will be rotated 180° in the opposite direction, to return the grippers to their normal position for gripping ware. In many instances it is not necessary to invert the ware, and one of the features of the mechanism resides in the provision of means whereby the device can be readily changed from an inverting to a non-inverting transfer, and vice versa. As described above, the bolt 487 normally secures the gear wheel to the annular plate 456 which carries the transfer guide brackets 455 and which is secured to the flange 457 of the cylinder 450. By merely removing the bolt 487, the gear wheel 486 is disconnected from the plate 456, and is thus rendered entirely inoperative; so that when the casting 420 is moved back and forth between the pick-up and delivery positions, the gear wheel will rotate as before, by reason of its engagement with the rack 489, but it will merely rotate freely without having any effect on the grippers or on the cylinder 450. To avoid any possible rotation of the cylinder and grippers after the gear wheel has been disconnected, I provide a set screw 491 which is adapted to engage in a groove 492 in the wall of the cylinder 450. Thus to eliminate the inverting feature it is only necessary to remove the bolt 487 and set up on the screw 491; and when it is again desired to invert the ware during transfer it is only necessary to insert the bolt 487 and withdraw the set screw 491.

The grippers, the means for opening and closing the grippers, and the means for adjusting the grippers for ware of different sizes, will now be described, reference being had particularly to Figures 1, 2, 5, 6 and 8. As described hereinbefore, the piston rod 452 carries a crosshead 454 which rides on the guide brackets 455. Mounted in upstanding brackets 493 on the top of the crosshead, is a shaft 494; and slidably mounted on this shaft are two forwardly extending parallel arms 495. Detachably mounted on the free ends of the arms 495 are gripper elements 496; the gripper elements being oppositely disposed, to cooperate with the two articles to be transferred. The gripper elements are preferably pinned to the ends of the arms 495, and the connection is somewhat loose to give the gripper elements 496 a slight latitude of movement to adjust themselves to the articles being transferred. The arms 495 are rigid, and as clearly shown in Figure 1, these arms project between the two articles to be transferred. These arms are simultaneously moved toward or from each other, to adjust them for different sizes of ware, by means of a rod 497 which has its end portions oppositely threaded in these arms 495. A knurled head 498 is provided for the purpose of rotating the oppositely threaded rod 497, to thereby simultaneously move the arms toward or from each other. It will be understood when these arms are adjusted they ride on the shaft 494, so that it is a true translation movement, whereby the centers of the gripper elements travel along the center line of the path of the ware. Thus in the adjustment of these gripper elements for larger or smaller ware, there is no possibility of the gripper elements being moved out of proper gripping relation with the ware to be transferred. Associated with each of the rigid gripper arms 495 is an oscillatable gripper arm 499, and as the construction of the two oscillatable grippers is identical, it will be sufficient to describe the construction of one of them. The oscillatable arms 499 are pivotally mounted on the ends of the brackets 455 by means of hinge pins 500. By reference to Figures 2 and 8, it will be seen that the oscillatable arm is formed of two vertically spaced sections, and mounted in the space between the sections is a triangular shaped member 501. Pinned to the forward end of this triangular member is the gripper element 502, and it may be mentioned that the gripper member is loosely mounted to provide adequate freedom of movement to permit the gripper member to accommodate itself to the ware being gripped. A rod 503 is pivotally attached to one corner of the triangular member 501, and the rod extends rearwardly through a collar 504 pivotally mounted adjacent the end of the crosshead 454. An adjusting nut 505 is threaded on the rear end of the rod and abuts against the collar, and a spring 506 is mounted on the rod and held under compression between the collar and the point of attachment of the rod to the triangular member 501. Thus the spring will tend to force the gripper to closed position, the extent of closing and opening being regulated by the nut 505. When the crosshead 454 is moved rearwardly, the collar 504 abutting against the nut 505 will swing the gripper to open position; and when the crosshead moves forwardly, the pressure of the spring 506 will force the gripper into closed position, but any undue pressure on the ware will be relieved by the spring.

It is desirable that the grippers carried by the rigid arms 495 should be diametrically opposed to the grippers carried by the oscillatable arms 499, when these parts are in gripping relation, irrespective of the diameter of the ware being handled. It is apparent that if the rigid arms be moved to accommodate either larger or smaller ware, the gripper elements carried by the rigid arms will retain their same relation to the ware, for the grippers will have been moved in a right line, which right line is the center line of the path of movement of the oncoming ware. But in accordance with the mechanism thus far described it is apparent that in adjusting the gripper 502 for larger or smaller ware, the gripper will travel in the arc of a circle about the hinge pin 500 as a center, and thus the gripper 502 would not be diametrically opposed to the gripper 496, when in gripping position. In order that the gripper 502 may retain its proper relation to the ware, when adjusted for larger or smaller ware, I have provided means for retaining this gripper, when in gripping position, in the center line of the path of the ware. It is for this reason that I have provided the triangular shaped member 501, which was referred to above, and the function of which will now be described; reference being had particularly to Figure 8. Adjacent the ends of the top and bottom sections of the pivotally mounted arm 499 are longitudinally extending slots 507, and about midway of the length of the top and bottom sections of this arm are diagonal slots 508. The triangular member 501 is provided with pins 509 and 510 which ride in the slots 507 and 508 respectively. A rod 511 is pivotally mounted on the pin 509, and extends rearwardly through a suitable opening 512 in the head of the hinge pin 500. Threaded on the outer end of the rod 511, and abutting against the head of the hinge pin 500, is an adjusting nut 513; and a coil spring 514 is mounted on the rod 511 and is held under compression between the head 500 of the hinge pin and the point where the rod is pivotally attached to the pin 509 on the triangular member. Suppose now, that the gripper elements 502 are to be adjusted to handle larger ware. By setting up on the nut 505 the gripper element 502 will be moved outwardly in the arc of a circle, of which the hinge pin 500 is the center. This adjustment causes the gripper to close to the extent desired to grip the larger ware, but the gripper will not be diametrically opposed to the gripper 496 on the rigid arm 495. To adjust the gripper 502 into its proper relation with the gripper 496, it is only necessary to unscrew the nut 513 to the desired extent, whereupon the spring 514 will force outwardly the triangular shaped member which carries the gripper 502. This outward movement of the triangular shaped member is guided by the slots 507 and 508. The slot 507 will permit the gripper member to move outwardly into the center line of the path of the ware, but this movement alone would not be sufficient for the gripper member 502 would still be inclined somewhat, due to its arcuate adjustment about the pivot 500. This is taken care of by the slot 508, for it will be apparent that as the gripper element moves outwardly guided by the slot 507, it will also be swung slightly about the pin 509 as a pivot, due to the movement of the pin 510 in the diagonal slot 508. Thus the gripper element 502 will have been so moved that it will bear exactly the same relation to the gripper element 496 that it did before the adjustment was made for larger (or smaller) ware, except, of course, the distance between the grippers 496 and 502 will be greater (or smaller).

In the operation of the grippers, it will be understood that when fluid pressure is admitted to the rear end of the cylinder 450, the whole gripper mechanism will be moved forwardly. This forward movement will project the two gripper elements 496 between the two articles to be gripped; and this forward movement will also swing the gripper elements 502 about their pivots 500, into cooperative gripping relation with the gripping elements 496, whereby the two articles will be simultaneously gripped, preparatory to being transferred. After the ware has been carried to the point of delivery, and the transfer mechanism has settled by gravity to its lowered position, fluid pressure is admitted to the forward end of the cylinder 450, thereby moving the crosshead 454 rearwardly to open the grippers 502 to release the transferred ware; and, of course, the continued rearward movement of the crosshead carries the complete gripper mechanism out of the path of the oncoming ware, preparatory to the bodily movement of the cylinder 450 and associated parts, back to the pick-up position.

I have described hereinbefore how the entire mechanism is moved bodily back and forth between pick-up and delivery position, by means of the piston 421 of the cylinder 418; and I shall now describe the means employed for cushioning the strokes of the piston 421, reference being had particularly to Figures 1 to 5, 9 and 9a. A passage 515 leads from the right hand end of the cylinder 418 to a small valve cylinder 516, and communicating with this valve cylinder is the pipe 445 which conveys the fluid under pressure to this end of the cylinder, and which also conveys the exhaust fluid from this end of the cylinder. Mounted in this valve cylinder is a valve 517 which is normally pressed to the left (Figs. 3, 4 and 9) by means of a spring 518, to maintain free communication between pipe 445 and passage 515. This valve 517 is provided with a stem 519 which projects through the closed end of the valve cylinder. A passage 520 leads from the left hand end of the cylinder 418 to a small valve cylinder 521, and communicating with this valve cylinder is the pipe 446 which conveys the fluid under pressure to this end of the cylinder. Mounted in this valve cylinder 521 is a valve 522 which is normally pressed to the right (Figs. 3, 4 and 9) by means of a spring 523, to maintain free communication between pipe 446 and passage 520. This valve is provided with a stem 524 which projects through the closed end of the valve cylinder.

The valves 517 and 522, and associated parts, are identical in construction, and therefore the description of one of them will be sufficient. The construction of these valves is best shown in Fig. 9, and in this figure the valve 517 is shown in its normal position, while valve 522 is shown in one of the positions it occupies while producing the cushioning effect. As illustrated in this Figure 9, the valves are hollow and are open at the ends facing the air pipes 445 and 446, and are closed at the opposite ends and merge into the valve stem which project through the ends of the valve cylinders. The outer wall of each of the valves 517 and 522 is provided with circumferential grooves 525 and 526; the grooves being arranged adjacent the ends of the valves; and the circumferential groove 526 is provided with one or more passages 527, to provide communication between the groove and the interior of the valve. The outer wall of each valve is also provided with longitudinal grooves 528 extending from the circumferential groove 525 to the circumferential groove 526. For a disclosure of the means for operating the valves 517 and 522, reference is to be had to Figures 1 to 5 and 9. Pivotally suspended from the casting 420 by a pin 529 is an arm 530, which normally projects vertically downward and at its lower end has a lug 531 which is adapted to alternately engage the valve stems 519 and 524. For the purpose of normally maintaining the arm 530 in alignment with the valve stems, the upper end of the arm is provided with a laterally extending finger 532 on which is mounted a counterweight 533, and the lower end of the arm is provided with a finger 534 which extends laterally in the opposite direction to finger 532, and carries a roller 535. This roller engages a flange or track 536 which projects from the cylinder casing 418 and which extends in a horizontal plane nearly the full length of the cylinder. But adjacent the ends of the cylinder the flange or track is turned downwardly, as indicated by numeral 537 (Fig. 4). The counterweight 533 maintains the roller 535 in contact with the horizontal track or flange 536, and thus the lug 531 is maintained in alignment with the valve stems 519 and 524, for substantially the full length of stroke of the piston 421 in either direction. But toward the end of the stroke, and after the lug has engaged one or the other of the valve stems, the roller 535 will start riding down the inclined portion 537 of the track 536, and will thereby start to move the lug 531 laterally, and just as the piston is about to complete its stroke the lug 531 will have been moved laterally sufficiently to release the valve stem, so that the valve may be returned to its normal position by means of its spring. The inner ends of the valve cylinders 516 and 521 are provided with ports 538 and 539 respectively, to prevent air from being trapped in the cylinders, which would resist the movement of the valves 517 and 522 by their springs. In describing the operation of these valves, reference is to be had to Figures 3, 4 and 9, and it will be assumed that the piston 421 is at the right hand end of its stroke and is just commencing its opposite stroke. Under such conditions the valve 522 will be in its normal position, i. e., at the right hand end of the valve cylinder so that the left hand end of cylinder 418 will have a free exhaust. As the piston 421 of cylinder 418 approaches the left hand end of its stroke, the lug 531 will engage the valve stem and start the movement of the valve 522 to the left. The first effect of this movement is that the valve will partly close the passage 520 and as the valve continues its travel to the left the groove 526 will come into register with the passage 520 and provide a restricted outlet for the exhaust air through this groove, passages 527, and thence through the interior of the valve to the pipe 446. The continued travel of the valve to the left will move the groove 526 out of alignment with the passage and thus shut off the exhaust from the left hand end of the cylinder 418; and just as this piston has about finished its stroke the groove 525 will come into alignment with the passage 520, so that the exhaust air will have a restricted outlet through circumferential groove 525, longitudinal grooves 528, circumferential groove 526, and passages 527, to the interior of the valve, and then to pipe 446. At the left of Figure 9, the valve 522 is shown as just reaching this position. During this movement of the valve to the left the roller 535 has engaged the downturned track 537, so that the lug 531 has been moved laterally some distance, but not sufficiently to escape from engagement with the valve stem 524. By an inspection of the left portion of Figure 9, it will be noted that the lug is almost in position to release the valve stem. By the time the piston 421 completes its stroke the lug will have been moved laterally a sufficient distance to release the valve stem 524, whereupon the spring 523 will move the valve 522 to its normal position, permitting free communication between the pipe 446 and the left hand end of cylinder 418; and the parts are now in position for air pressure to be admitted to the left hand end of the cylinder to cause the piston to travel in the opposite direction. The valve 522 will remain in its normal position until the piston 421 has completed its right hand stroke and is again approaching the end of its left hand stroke.

During the right hand stroke of the piston 421, the lug will cooperate with the valve stem 519 in exactly the same manner as described above in connection with the valve stem 524; and the valve 517 will function in the same manner as valve 522, to provide the cushioning effect for the piston.

Each end of the cylinder 418 may be provided with a port 418', which is connected with a short pipe section 418", in which there is a valve 418''' controlling communication with the atmosphere. By the adjustment of these bleeder valves 418''' I am able to regulate the rapidity of movement of the piston 421, in either direction, and also to release an over accumulation of water and oil that would otherwise prevent the full travel of piston 421. The above described construction is illustrated in Figure 4.

The preferred means for mounting and adjusting the cams 424, 425 and 426, referred to hereinbefore, will now be described; reference being had particularly to Figures 2, 10, 10a, 11 and 13. Cam 424 is mounted on a disc 424a which is keyed to the main driving shaft 153 of the fire-finisher conveyer. Also keyed to this driving shaft is the sprocket 541 which operates the revolving disc 540 upon which the ware is deposited by the transfer mechanism. Cam 424 controls the closing of the grippers, etc., and it is therefore essential that this cam function at the instant the ware carrying cups are in position for the grippers to grasp the ware. Accordingly cam 424 remains a fixed factor with respect to the fire-finisher conveyer. Any change in speed of operation of the fire-finisher conveyer, will produce a like change in the operation of the cam 424, and the jaws will always operate to grasp the ware at the proper instant. For this purpose of initially adjusting the cam 424 to proper position, the cam is secured to the disc 424a by means of the bolt and slot connection, indicated by numerals 427 and 428.

As described hereinbefore cam 424 controls the closing of the grippers, the elevation of the ware, and the transfer of the ware; but the transfer mechanism must settle by gravity, when the pressure in the lower end of cylinder 410 is released. The grippers cannot be opened to release the ware until the transfer mechanism has been lowered, and the transfer mechanism cannot be moved back to pick-up position until the grippers are opened. Any change in speed of operation of the fire-finisher conveyer, has no effect on the time required for the transfer mechanism to settle by gravity. Accordingly it is necessary to advance or retard the cams 425 and 426, when the speed of the fire-finisher conveyer is changed. Cam 426 controls the opening of the grippers, and cam 425 controls the movement of the transfer mechanism back to pick-up position. The relation between cams 425 and 426 is practically a fixed factor, and it is therefore desirable that means be provided to simultaneously adjust cams 425 and 426, with respect to cam 424. Cam 425 is mounted on a disc 425a which is loosely mounted on the shaft 153; the cam being adjustable with respect to the disc by means of bolt and slot connection 427, 428.

Cam 426 is mounted on a disc 426a which is loosely mounted on the shaft 153; the cam 426 being adjustable with respect to disc 426a by means of bolt and slot connection 427, 428. The discs 425a and 426a are formed into a unitary structure by means of bolts 426b which pass through the two discs and also through suitable spacing sleeves 426c arranged between the two cam discs. Adjusting screws 426e are threaded through the bolt heads 426d of bolts 426b. The ends of these adjusting screws 426e bear against a yoke member 426f which is keyed to the driving shaft 153. As the yoke member is keyed to the shaft 153, and as screws 426e engage the yoke member, and as the discs 425a and 426a are connected by bolts 426b, it is apparent that the discs, and consequently the cams 425 and 426 mounted thereon, are driven by the shaft 153. It is also apparent that by advancing one of the adjusting screws and withdrawing the other adjusting screw, the cams 425 and 426 will be adjusted as a unit.

As stated above the relation between cams 425 and 426 remains constant, as the function of these cams is to open the grippers and return the transfer mechanism to the pick-up position. They are originally adjusted to the proper position and then clamped to their discs by means of bolts 428. If the speed of operation of the fire-finisher should be changed, cam 424 will continue to function properly, but cams 425 and 426 will have to be slightly advanced or retarded, without changing the relation between them. To make such an adjustment it is only necessary to slightly advance one of the adjusting screws 426e and slightly withdraw the other adjusting screw, whereby the cams 425 and 426 will be slightly rotated about the shaft 153.

It is believed that the construction, function, and operation, of all the parts of this transfer mechanism will be understood from the foregoing description, and I shall now describe, in a general way, a complete cycle of operation, in order to give a better understanding of the operative relation that the various parts bear to one another. For the purpose of this description of the operation, it will be assumed that the grippers are in their rearward open position out of the path of the ware in the cups 186; that the transfer mechanism is at the right hand end of the stroke, i. e., at the pick up position; that the transfer mechanism is in its lowered position, which position is regulated by the threaded rod 417; and that the ware is to be inverted during its transfer.

The ware to be transferred is being continuously carried forward in the cups 186, and after the various operations have been performed on the articles, the cups are opened by mechanism not described herein, to release the articles to permit them to be removed. At the proper instant, as illustrated diagrammatically in Figure 3, the cam 424 will trip the valve 432' against the pressure of spring 432''. The tripping of valve 432' will permit fluid pressure to flow from pipe 436 through pipe 442 to the lower end of cylinder 410, and through pipe 475c to cylinder 475. Cylinder 475 is of considerably smaller diameter than cylinder 410, and consequently cylinder 475 will function an instant earlier than cylinder 410. The admission of fluid pressure to cylinder 475 causes the piston rod 475a to be projected forward into engagement with the shuttle valve stem 472, thereby shifting the shuttle valve to the position indicated in Figure 3. This shifting of the shuttle valve permits the live air in pipe 463 to flow through passage 478 and 479 to the rear end of cylinder 450. The introduction of fluid pressure at the rear of cylinder 450 will cause piston 451 and piston rod 452 to move forwardly to operate the grippers. As the piston rod moves forward the gripper elements 496, carried by the rigid arms 495, will be projected between the two articles to be transferred; and at the same time the grippers 502 carried by the oscillatable arms 499 will be swung into cooperative relation with the grippers 496, whereby the two articles are simultaneously gripped preparatory to being transferred. During this forward movement of the piston 451, the air in the forward end of the cylinder exhausts through passages 482 and 483 to the shuttle valve, and thence through passage 470, to the atmosphere; the passage 470 being controlled by needle valve 471 to provide a cushioning effect for the piston 451 on its forward stroke. I have previously described the manner in which the grippers are adjusted for ware of different sizes, and the means for adjusting the forward limit of movement of the grippers; such means comprising the rod 459 which is attached to the piston 451, projects through the rear end of the cylinder 450, and has nuts 462 threaded on its free end.

As stated above, air pressure is also admitted to the lower end of cylinder 410 by the tripping of the valve 432', and thus almost instantaneous with the gripping of the ware the piston 411 will be moved upwardly, thereby bodily elevating the transfer mechanism, to lift the ware clear of the cups 186 and cup fingers 189; the upper stroke of the piston 411 of cylinder 410 being cushioned by means of the needle valve 443'.

Just as the piston 411 is about to complete its upward stroke it uncovers the port 444, to permit the fluid pressure that is being supplied to the lower end of cylinder 410, to flow through the pipe 445, valve cylinder 516, and passage 515, to the right hand end of cylinder 418. This will cause the piston 421 to move to the left, and as the piston is connected with the casting 420 by means of rods 422, and 423, the casting 420 and transfer mechanism will move to the left, to carry the ware from the pick-up position to the delivery position; the casting 420 being guided in its movement by the dovetail track 419. During this stroke of the piston 421, the left hand end of cylinder 418 will be exhausting through passage 520, valve cylinder 521, pipe 446, valve 433', and thence through port 440 to atmosphere. During this stroke of the piston 421, the air pressure beneath piston 411 has maintained the transfer mechanism in elevated position, but just as the piston 421 is about to complete its stroke, the cam 424 will release the valve 432' so that the spring 432'' will move the valve upwardly, shutting off communication between the air line 436 and the bottom of cylinder 410, and opening communication between the lower end of the cylinder and the atmosphere, through port 439 of the valve casing 432. This will permit the piston 411 and the transfer mechanism supported thereby, to settle by gravity into position to release the transferred ware; the lowered position of the piston and transfer mechanism being regulated by the threaded rod 417.

While the left hand stroke of the piston 421 is being made, the cylinder 450 is being rotated through 180° by reason of the gear wheel 486 meshing with the rack 489, to thereby invert the ware in the manner hereinbefore described in detail. While the ware is being inverted pressure is maintained behind the piston 451, to keep the grippers closed and in their forward position, by means of the groove 480 which extends almost half way around the outer wall of the cylinder 450. This groove terminates in advance of the exhaust port 481; and just as the cylinder 450 completes its half revolution, the exhaust port 481 will come into alignment with the passage 478, so that the air behind the piston 451 will exhaust just as soon as the shuttle valve 469 is shifted.

During this stroke of the piston 421 the lug 531 will engage the valve stem 524 to operate the valve 522, in the manner described, to provide a cushioning effect for the piston 421; the valve stem being released as the piston completes its stroke, by reason of the lateral movement of the lug 531 caused by the roller 535 following the downwardly curved track 537. Thus far the ware has been gripped, elevated, transferred, inverted, and lowered; and it is only necessary to open the grippers to release the ware, and return the transfer mechanism to pick-up position, to complete the cycle of operation. Just as the transfer mechanism settles by gravity to its lowered position, cam 426 will trip valve 434', thereby permitting fluid pressure to pass from pipe 438 to pipe 476c and thence to the end of cylinder 476. The piston rod 476a will thus be shot forward into engagement with the shuttle valve stem 473, thereby shifting the shuttle valve 469 to position to permit the live air from pipe 463 to pass through passage 483 and port 484 to the forward end of cylinder 450, and permit the air in the rear end of the cylinder 450 to exhaust through port 481 and passages 478 and 470, to atmosphere. The grippers will thus be opened to release the inverted ware, which will be received upon any suitable support, which in this particular case is a rotating disc, to be described hereinafter. The ware has been released, and the grippers have been drawn back out of the path of the oncoming ware. To hold the grippers open and in this retracted position, the air pressure will be maintained in the forward end of cylinder 450, by means of the groove 485 which extends almost half way around the outer wall of the cylinder. The grippers having been opened and retracted, cam 425 now trips valve 433' to open communication between pipes 437 and 446, whereby air under pressure is admitted to the left hand end of cylinder 418. This return stroke of the piston 421 will move the casting 420 and the entire transfer mechanism back to the pick-up position; and during this return stroke the right hand end of cylinder 418 will exhaust through passage 515, valve cylinder 516, pipe 445, cylinder 410, and needle valve port 443 to the atmosphere. This return stroke of the piston 421 is cushioned by means of the lug 531 engaging the stem 519 of the valve 517, in exactly the same manner as described above in connection with cushioning the opposite stroke. During the return stroke, the cylinder 450 and the grippers are, of course, rotated through 180° in the opposite direction. A complete cycle of operation has been described, and the transfer mechanism is back at the starting point, in lowered position, and with the grippers retracted and open. The cam 424 will now trip the valve 432' to shift the shuttle valve and thereby start another cycle of operation.

In the operation described above, the piston 411 and the transfer mechanism supported thereby, are permitted to settle by gravity into position to release the ware. In Figure 3a I show a modified arrangement by which the downward movement of the piston and transfer mechanism is positively operated, thereby affording a quicker and more accurately timed operation. For this purpose, I provide two pipes 442 and 442' leading from valve casing 432. Pipe 442 supplies fluid pressure to cylinders 410, 475 and 418, as previously described. Pipe 442' leads to the upper end of cylinder 410. In place of the valve 432' I substitute the valve 432a provided with the branch passages 432b and 432c which communicate alternately with the pipes 442' and 442. A guide pin 432f prevents the rotation of the valve. The valve casing 432 is provided with exhaust ports 432d and 432e. The remaining structure illustrated in Figure 3a is identical with the disclosure of Figure 3. In the operation of the modified form illustrated in Figure 3a, the same 424 will trip the valve 432a, thereby moving it downwardly to bring passage 432c into alignment with pipe 442, whereupon the fluid pressure from pipe 436 will flow to the lower end of cylinder 410, and to the cylinders 475 and 418, just as described in connection with Figure 3. The grippers will thus be closed, and the transfer mechanism will be elevated and moved from pick-up position to delivery position. The transfer mechanism is now ready to be lowered into position to deliver the transferred ware. In the previously described form the transfer mechanism was allowed to settle by gravity, but in the present form, when the cam 424 releases valve 432a, and the spring 432" moves it upwardly, the branch passage 432b will align with pipe 442', whereby fluid pressure will flow from pipe 436 through pipe 442' to the upper end of cylinder 410, so that the piston 411, and the transfer mechanism carried thereby, will be positively lowered. When the valve 432a is in its upper position, the lower end thereof is above the port to pipe 442, so that this pipe is free to exhaust to atmosphere through exhaust port 432e; and when the valve 432a is in its lower position, its upper end is below the port to pipe 442', so that this pipe is free to exhaust to atmosphere through exhaust port 432d. With the exception of the positive lowering movement of the transfer mechanism, the entire operation of the transfer mechanism remains exactly the same as described hereinbefore.

In the description of a complete cycle of operation of the transfer mechanism, I have described the mechanism as simultaneously transferring two articles; but it is obvious that without any change it may be employed for transferring one article at a time; and it is also obvious that by slight modifications it may be employed to simultaneously transfer three or four articles.

Also in the foregoing description of a cycle of operation of the transfer mechanism, I have included the step of inverting the ware; but this step may be omitted by merely withdrawing the bolt 487, and setting up on the screw 491. Also in the present mechanism, the step of inverting the ware occurs during its travel from the pick-up position to delivery position, but it is apparent that means may be substituted for inverting the ware at the pick-up position, or at the delivery position, instead of during the passage from pick-up to delivery position.

In the preferred form of the apparatus, as disclosed herein, the transferred ware is deposited on a continuously rotating disc 540, and I shall now describe the means for operating this disc, and the means for guiding the ware from the disc to a leer cross-conveyer, or other conveyer; reference being had particularly to Figures 11, 12 and 13. Mounted on the main drive shaft 153 is a sprocket wheel 541 which has a driving connection with a relatively small sprocket wheel 542, by means of a sprocket chain 543. The small sprocket wheel 542 is fixed to a shaft 544, and fixed to the opposite end of this shaft is a bevel gear 545. This bevel gear meshes with a bevel gear 546 which is mounted for rotation on a shaft 547. Also mounted for rotation on the shaft 547 is a plate 548, which is connected with the bevel gear 546 to rotate therewith, and which carries the disc 540 on which the ware is deposited. The shaft 547 has its lower end reduced in diameter to form a shoulder 549, and the reduced portion 550 extends downwardly through a frame member and has a nut 551 threaded on its lower end, whereby the shaft is rigidly clamped to the frame member; such details of construction being illustrated in Figure 12.

By the means described above the disc 540 will be continuously rotated in the direction indicated by the arrows in Figure 13; and in this same Figure I have shown, in broken lines, the position two articles will occupy at the moment they are deposited on the disc. For the purpose of guiding the articles on the leer or other conveyer, I provide two guide members, indicated by numerals 552 and 553. The guide member 553 is provided with a bracket 554 by which it is attached to the frame member, and guide member 552 is secured to the upper end of the stationary shaft 547 by means of the bolt 555; both guide members being suitably curved to direct the ware onto the continuously moving conveyer 556 which is directly adjacent the disc, so that the ware will pass from the disc to the conveyer. By an inspection of Figure 13; it will be noted that the two articles, shown in broken lines, are so placed on the disc that one is near the center thereof, while the other is near the periphery thereof. The outer article, by reason of its faster travel, will take a position in advance of the inner article, so that the articles will be in a single file by the time they reach the conveyer; the approximate relative position the two articles will be caused to occupy by the rotation of the disc, being illustrated in full lines in Figure 13. Of course, the disc and guide members may be eliminated, by depositing the ware directly on the leer cross-conveyer or other conveyer, and that may be desirable in certain installations. But it will be understood that by employing this disc, the complete machine, which extends from the forming machine to the leer, may be arranged at almost any desired angular relation with respect to the leer or the forming machine, and this feature is of very considerable practical importance.

Obviously many changes and modifications may be made without departing from the spirit of the invention; and all such changes and modifications are intended to be included within the scope of the appended claims.

What I claim is:

1. A transfer mechanism including mechanical grippers for simultaneously gripping the sides of a plurality of glass articles arranged on opposite sides of a center of rotation, means for inverting the articles about the center of rotation, and means for shifting the center of rotation while the articles are being inverted.

2. A transfer mechanism including means for gripping the sides of a plurality of articles arranged on opposite sides of a center of rotation, means for vertically elevating the articles after they have been gripped, means for transferring the articles in a horizontal path, and means for inverting the articles about the center of rotation during their travel in the horizontal path.

3. A transfer mechanism including a pair of grippers for gripping glassware to be transferred, a member carrying said grippers, a cylinder for moving said member back and forth in a horizontal plane between receiving and delivering position, a gear oscillating the grippers through substantially 180° as the member moves back and forth, and means for rendering said gear inoperative.

4. A conveyer for transporting glassware, a transfer mechanism including grippers arranged at one side of said conveyer, means for projecting the grippers forwardly into the path of the glass articles on the conveyer, means for vertically elevating the grippers, means for moving the grippers laterally in a horizontal path, means for rotating the grippers through substantially 180° during the lateral travel, means for lowering the grippers, means for opening the grippers and withdrawing them from the path of the oncoming ware on the conveyer, and means for returning the grippers in a horizontal path to the original position.

5. A conveyer for transporting glassware, a transfer mechanism including grippers arranged at one side of said conveyer, means for projecting the grippers forwardly into the path of the glass articles on the conveyer, means for vertically elevating the grippers, means for moving the grippers laterally in a horizontal path, means for rotating the grippers through substantially 180° during the lateral travel, means for rendering inoperative said rotating means, means for lowering the grippers, means for opening the grippers and withdrawing them from the path of the oncoming ware on the conveyer, and means for returning the grippers in a horizontal path to the original position.

6. A device for transferring glassware including two diametrically opposed gripper elements, a rigid arm carrying one of said grippers, an arm oscillatable in an arc and carrying the other of said grippers, and means for adjusting the oscillatable arm only for different sizes of ware without disturbing the diametrically opposed relation of the gripper elements.

7. A device for transferring glassware including a pair of gripper elements, an oscillatable arm, said arm having angularly disposed slots, a member mounted on said arm guided by said slots, means for adjusting said member with respect to said arm, and one of said grippers carried by said member.

8. A device for transferring glassware including a pair of gripper elements, a rigid arm carrying one of said grippers, means for adjusting said arm and gripper for different sizes of ware, an oscillatable arm, said oscillatable arm having angularly disposed slots, a member mounted on said oscillatable arm and guided by said slots, means for adjusting said member with respect to said oscillatable arm, and the other of said gripper elements carried by said member.

9. A device for transferring glassware including a horizontal shaft, pairs of gripper elements disposed on opposite sides of said shaft, and means for oscillating the shaft through 180°.

10. A device for transferring glassware including pairs of gripper elements, a horizontal shaft carrying said pairs of gripper elements, the pairs of gripper elements disposed on opposite sides of the shaft, means for moving said shaft back and forth, and means for oscillating said shaft.

11. A device for transferring glassware including pairs of gripper elements, a horizontal shaft carrying said pairs of gripper elements, the pairs of gripper elements disposed on opposite sides of the shaft, means for moving said shaft back and forth, and means for oscillating said shaft during its translation.

12. A device for transferring glassware including pairs of gripper elements, a horizontal shaft carrying said pairs of gripper elements, the pairs of gripper elements disposed on opposite sides of the shaft, means for moving said shaft back and forth, means for oscillating said shaft, and means for rendering inoperative the said oscillating means.

13. A device for transferring glassware including a shaft, pairs of grippers arranged on opposite sides of said shaft, means for elevating the shaft, and means for moving the shaft back and forth in a rectilinear path between pick-up and delivery position.

14. A device for transferring glassware including pairs of gripper elements, a shaft carrying said pairs of gripper elements, the pairs of grippers disposed on opposite sides of the shaft, a gear adapted to be operatively connected with said shaft, a rack associated with said gear, and means for moving said shaft back and forth in a rectilinear path between pick-up and delivery position.

15. A device for transferring glassware including a piston rod, grippers operatively associated with the piston rod, a cylinder for reciprocating the piston rod, means for bodily lifting the cylinder and piston rod, and means for moving the cylinder back and forth between pick-up and delivery position, and means for rotating the piston rod about its axis.

16. A device for transferring glassware including a piston rod, grippers operatively associated with the piston rod, a cylinder for reciprocating the piston rod, means for bodily lifting the cylinder, means for moving the cylinder back and forth between pick-up and delivery position, and means for rotating the cylinder.

17. A device for transferring glassware including a piston rod, grippers operatively associated with the piston rod, a cylinder for reciprocating the piston rod, means for moving the cylinder back and forth between pick-up and delivery position, and means for rotating the cylinder about its axis.

18. A device for transferring glassware including horizontally disposed grippers a horizontal cylinder for operating the grippers, and means for rotating the cylinder about its longitudinal axis.

19. A device for transferring glassware including two pairs of grippers, a cylinder for operating both pairs of grippers, means for rotating the cylinder about its own axis, and means for rendering said rotating means inoperative.

20. A device for transferring glassware including a pair of grippers, a cylinder for operating said grippers, a gear associated with said cylinder, means whereby the gear and cylinder can be connected or disconnected, a rack meshing with said gear, and means for moving the cylinder back and forth between pick-up and delivery position to rotate said gear.

21. A device for transferring glassware including gripper elements, a cylinder for operating the gripper elements, means for moving the cylinder back and forth between pick-up and delivery position, a shuttle valve for controlling the admission of fluid to said cylinder, and fluid operating pistons for shifting the shuttle valve.

22. A device for transferring glassware including gripper elements, a cylinder for operating the gripper elements, means for moving the cylinder back and forth between pick-up and delivery position, a shuttle valve for controlling the admission of fluid to said cylinder, plungers located adjacent the pick-up and delivery positions and in alignment with the shuttle valve, and means for operating said plungers to shift the shuttle valve.

23. A device for transferring glassware including gripper elements, a cylinder for operating the gripper elements, means for moving the cylinder back and forth between pick-up and delivery position, a shuttle valve for controlling the admission of fluid to said cylinder, cylinders located adjacent the pick-up and delivery positions and having their pistons in alignment with the shuttle valve, and means for operating these second-mentioned cylinders at the desired times.

24. A device for transferring glassware including gripper elements, a cylinder for operating the gripper elements, a second cylinder for moving the first-mentioned cylinder back and forth between pick-up and delivery position, a valve adjacent each end of the second-mentioned cylinder for producing a cushioning effect, and means controlled by the movement of the first-mentioned cylinder for operating said valves.

25. A device for transferring glassware including gripper elements, a cylinder for operating the gripper elements, a second cylinder for moving the first-mentioned cylinder back and forth between pick-up and delivery position, and a third cylinder for bodily raising and lowering the first and second-mentioned cylinders.

26. A device for transferring glassware including gripper elements, a cylinder for operating the gripper elements, means for rotating the grippers to invert the ware, a second cylinder for moving the first-mentioned cylinder back and forth between pick-up and delivery position, and a third cylinder for bodily raising and lowering the first and second-mentioned cylinders.

27. A continuously moving conveyor, cams operatively connected with the driving mechanism of said conveyer, valves operated by said cams, gripper elements, a cylinder for opening and closing said gripper elements, a second cylinder for moving the first-mentioned cylinder back and forth between pick-up and delivery position, and a third cylinder for raising and lowering the first and second-mentioned cylinders, said valves controlling the operation of said cylinders.

28. A continuously moving endless conveyor, cams operatively connected with the driving mechanism of said conveyer, a transfer mechanism including gripper elements for gripping and transferring ware from said conveyor, a cylinder for opening and closing the gripper elements, a cylinder for raising and lowering the gripper elements, a cylinder for moving the gripper elements back and forth between pick-up and delivery position, and valves for controlling the operation of said cylinders, the valves being operated by said cams.

29. A conveyer, cams operatively connected with the driving mechanism of said conveyer, a transfer mechanism including gripper elements for gripping and transferring were from said conveyor, one of said cams controlling the closing of the grippers, another of said cams controlling the opening of the grippers, and another of said cams controlling the movement of the grippers from delivery position back to pick-up position, and means for adjusting the second and third-mentioned cams as a unit, with respect to the first-mentioned cam.

IRA H. FREESE.